(12) United States Patent
Lin et al.

(10) Patent No.: US 12,149,364 B2
(45) Date of Patent: Nov. 19, 2024

(54) FEEDBACK INFORMATION PROCESSING METHOD AND RELATED DEVICE

(71) Applicant: GUANGDONG OPPO MOBILE TELECOMMUNICATIONS CORP., LTD., Dongguan (CN)

(72) Inventors: Yanan Lin, Dongguan (CN); Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 381 days.

(21) Appl. No.: 17/545,718

(22) Filed: Dec. 8, 2021

(65) Prior Publication Data
US 2022/0103308 A1 Mar. 31, 2022

Related U.S. Application Data

(63) Continuation of application No. PCT/CN2019/109643, filed on Sep. 30, 2019.

(51) Int. Cl.
*H04L 1/1829* (2023.01)
(52) U.S. Cl.
CPC .................... *H04L 1/1854* (2013.01)
(58) Field of Classification Search
CPC ... H04L 1/1854; H04L 1/1861; H04L 1/1864; H04L 5/0055; H04L 1/1822; H04L 1/16; H04L 1/1809
See application file for complete search history.

(56) References Cited

U.S. PATENT DOCUMENTS

| | | | |
|---|---|---|---|
| 10,511,414 B2* | 12/2019 | Liu | H04L 5/0055 |
| 11,601,250 B2* | 3/2023 | Peng | H04L 5/0055 |
| 11,832,275 B2* | 11/2023 | Kim | H04L 1/1671 |
| 2015/0049709 A1 | 2/2015 | Damnjanovic et al. | |
| 2017/0346606 A1* | 11/2017 | Li | H04L 1/1822 |
| 2019/0159251 A1 | 5/2019 | Li et al. | |
| 2020/0295810 A1* | 9/2020 | Baldemair | H04L 1/1822 |
| 2021/0075556 A1* | 3/2021 | Karaki | H04L 1/1887 |

(Continued)

FOREIGN PATENT DOCUMENTS

| | | |
|---|---|---|
| CN | 106788936 A | 5/2017 |
| CN | 108023719 A | 5/2018 |
| CN | 108702253 A | 10/2018 |

(Continued)

OTHER PUBLICATIONS

First Office Action issued in corresponding European Application No. 19947958.5, mailed Feb. 14, 2023.

(Continued)

*Primary Examiner* — Kodzovi Acolatse
*Assistant Examiner* — Anindita Sen
(74) *Attorney, Agent, or Firm* — BAYES PLLC

(57) ABSTRACT

Disclosed are a feedback information processing method and a related device. The method includes receiving, by a terminal, signaling that is used to determine at least one carrier of N carriers. N is a positive integer. The method also includes generating, by the terminal, a feedback information codebook. The feedback information codebook includes feedback information corresponding to all hybrid automatic repeat request (HARQ) processes within the at least one carrier of the N carriers.

20 Claims, 7 Drawing Sheets

(56) References Cited

U.S. PATENT DOCUMENTS

2022/0166555 A1* 5/2022 Takeda .................. H04L 1/188

FOREIGN PATENT DOCUMENTS

| CN | 109639398 A | 4/2019 | |
|---|---|---|---|
| CN | 104243108 B | 6/2019 | |
| CN | 109863708 A | 6/2019 | |
| CN | 110138523 A | 8/2019 | |
| WO | 2017050265 A1 | 3/2017 | |
| WO | WO-2019154126 A1 * | 8/2019 | ........... H04L 1/1812 |

OTHER PUBLICATIONS

Third Office Action issued in corresponding European Application No. 19947958.5, mailed Nov. 15, 2023.
First Office Action issued in corresponding Chinese Application No. 202210899515.4, mailed Jun. 22, 2023.
Notice of Allowance issued in corresponding Chinese Application No. 202210899515.4, mailed Aug. 28, 2023.
Second Office Action issued in corresponding European Application No. 19947958.5, mailed Jul. 14, 2023.
Huawei, "Feature lead summary#3 of HARQ enhancements for NR-U", 3GPP TSG RAN WG1 Meeting #98 R1-1909806 Prague, Czech Republic, Aug. 26-30, 2019.
International Search Report issued in corresponding International Application No. PCT/CN2019/109643, mailed Apr. 15, 2020, 26 pages.
Written Opinion of the International Searching Authority issued in corresponding International Application No. PCT/CN2019/109643, mailed Apr. 15, 2020, 9 pages.
Extended European Search Report issued in corresponding European Application No. 19947958.5, mailed May 12, 2022.

* cited by examiner

US 12,149,364 B2

FEEDBACK INFORMATION PROCESSING METHOD AND RELATED DEVICE

CROSS-REFERENCE TO RELATED APPLICATION

This application is a continuation of International Application No. PCT/CN2019/109643, filed on Sep. 30, 2019, the entire contents of which are hereby incorporated by reference.

BACKGROUND

The present disclosure relates to the field of communication technology, and in particular to a feedback information processing method and related device.

An unlicensed spectrum is a spectrum divided by countries and regions that can be used for radio device communications. This spectrum is usually considered to be a shared spectrum, that is, communication devices in different communication systems can use this spectrum as long as they meet the regulatory requirements set by the country or region on the spectrum, and there is no need to apply for a proprietary spectrum authorization from the government. In order to allow various communication systems that use the unlicensed spectrum for wireless communication to coexist friendly on the spectrum, some countries or regions have stipulated the legal requirements that must be met when using the unlicensed spectrum. For example, in some regions, the communication device follows a "Listen before talk" (LBT) principle, that is, the communication device needs to perform channel listening before sending signals on channels of the unlicensed spectrum, and can send the signals only when the listening result is that the channel is free. If the channel listening result of the communication device on the channel of the unlicensed spectrum is that the channel is busy, the communication device cannot send signals. In order to ensure fairness, in one transmission, the time duration that a communication device uses a channel of the unlicensed spectrum for signal transmission cannot exceed a Maximum Channel Occupation Time (MCOT). With the development of wireless communication technology, Long Term Evolution (LTE) systems and 5th generation mobile networks or 5th generation wireless systems (5G) New Radio (NR) systems will consider deploying the network on the unlicensed spectrum so as to perform transmission of data services using the unlicensed spectrum.

SUMMARY

The embodiments of the present disclosure provide a feedback information processing method and related device.

In a first aspect, embodiments of the present disclosure provide a feedback information processing method, including receiving, by a terminal, signaling that is used for the terminal to determine at least one carrier of N carriers, where N is a positive integer; and generating, by the terminal, a feedback information codebook, where the feedback information codebook includes feedback information corresponding to all hybrid automatic repeat request HARQ processes within the at least one carrier of the N carriers.

In a second aspect, embodiments of the present disclosure provide a feedback information processing method, which is applied to a network device, and the method includes sending, by a network device, signaling that is used for a terminal to determine at least one carrier of N carriers, where N is a positive integer; and receiving, by the network device, a feedback information codebook from the terminal, where the feedback information codebook includes feedback information corresponding to all the hybrid automatic repeat request HARQ processes within the at least one carrier of the N carriers.

In a third aspect, embodiments of the present disclosure provide a feedback information processing device, which is applied to a terminal and includes a processing unit and a communication unit, where the processing unit is configured to receive signaling through the communication unit, where the signaling is used for the terminal to determine at least one carrier of N carriers, where N is a positive integer; and to generate a feedback information codebook, where the feedback information codebook includes feedback information corresponding to all hybrid automatic repeat request HARQ processes within the at least one carrier of the N carriers.

In a fourth aspect, embodiments of the present disclosure provide a feedback information processing device, which is applied to a network device and includes a processing unit and a communication unit, where the processing unit is configured to send signaling through the communication unit, where the signaling is used for a terminal to determine at least one carrier of N carriers, where N is a positive integer; and to receive a feedback information codebook from the terminal through the communication unit, where the feedback information codebook includes feedback information corresponding to all the hybrid automatic repeat request HARQ processes within the at least one carrier of the N carriers.

In a fifth aspect, embodiments of the present disclosure provide a terminal, including a processor, a memory, a communication interface, and one or more programs, where the one or more programs are stored in the memory and are configured to be executed by the processor, and the program includes instructions for performing the steps of any method in the first aspect of the embodiments of the present disclosure.

In a sixth aspect, embodiments of the present disclosure provide a network device, including a processor, a memory, a communication interface, and one or more programs, where the one or more programs are stored in the memory and are configured to be executed by the processor, and the program includes instructions for performing the steps of any method in the second aspect of the embodiments of the present disclosure.

In a seventh aspect, embodiments of the present disclosure provide a chip, including: a processor, configured to call and run a computer program from a memory, to cause a device installed with the chip to perform part or all of the steps of any method in the first aspect or the second aspect of the embodiments of the present disclosure.

In an eighth aspect, embodiments of the present disclosure provide a computer-readable storage medium that stores a computer program for electronic data exchange, wherein the computer program causes a computer to perform part or all of the steps of any method in the first aspect or the second aspect of the embodiments of the present disclosure.

In a ninth aspect, embodiments of the present disclosure provide a computer program, wherein the computer program is operable to cause a computer to perform part or all of the steps of any method in the first aspect or the second aspect of the embodiment of the present disclosure. The computer program may be a software installation package.

BRIEF DESCRIPTION OF THE DRAWINGS

The drawings that will be used in the description of the embodiments or the prior art will be briefly introduced below.

DETAILED DESCRIPTION

The technical solutions in the embodiments of the present disclosure will be described below in conjunction with the accompanying drawings.

Figure 1A:
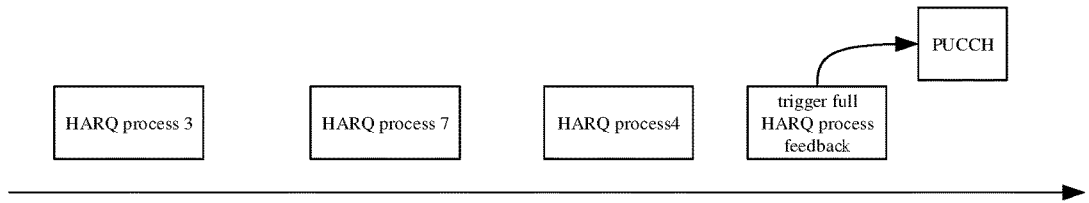
FIG. 1A is a diagram of an example of triggering full HARQ process feedback provided by an embodiment of the present disclosure.

In release 16 (Rel-16), NR-based Access to Unlicensed Spectrum (NR-U) is currently confirmed to support a method of feeding back Acknowledgement/Negative Acknowledgement (ACK/NACK) feedback information based on all Hybrid Automatic Repeat reQuest (HARQ) processes. Specifically, the terminal supports a maximum of N HARQ processes. When the base station triggers the terminal to perform full HARQ process feedback, no matter how many HARQ processes the terminal actually receives, it will always feedback the ACK/NACK feedback information corresponding to the N processes to the base station. The ACK/NACK feedback information may be mapped into a feedback information codebook in an order of HARQ process numbers. The ACK/NACK feedback information corresponding to the HARQ process that is not received is set as placeholder information (such as negative acknowledgement NACK). Taking FIG. 1A as an example, it is assumed that the terminal supports a maximum of 8 HARQ processes, and one HARQ process is transmitted through a Physical Downlink Shared CHannel (PDSCH) at a time. The maximum number of transport blocks (TBs) supported by the terminal is 2 (that is, a PDSCH carries a maximum of 2 TBs), and each TB corresponds to independent ACK/NACK feedback information. The terminal receives HARQ processes 3, 7, and 4, and when the base station triggers the terminal to perform full HARQ process feedback, the terminal transmits the feedback information codebook $\{NACK_{HARQ0,TB0}, NACK_{HARQ0,TB1}, NACK_{HARQ1,TB0}, NACK_{HARQ1,TB1}, NACK_{HARQ2,TB0}, NACK_{HARQ2,TB1}, b_{HARQ3,TB0}, b_{HARQ3,TB1}, b_{HARQ4,TB0}, b_{HARQ4,TB1}, NACK_{HARQ5,TB0}, NACK_{HARQ5,TB1}, NACK_{HARQ6,TB0}, NACK_{HARQ6,TB1}, b_{HARQ7,TB0}, b_{HARQ7,TB1}\}$ in a PUCCH, where $b_{HARQi,TBj}$ represents the ACK/NACK feedback information corresponding to TBj in the HARQ process i.

Figure 1B:
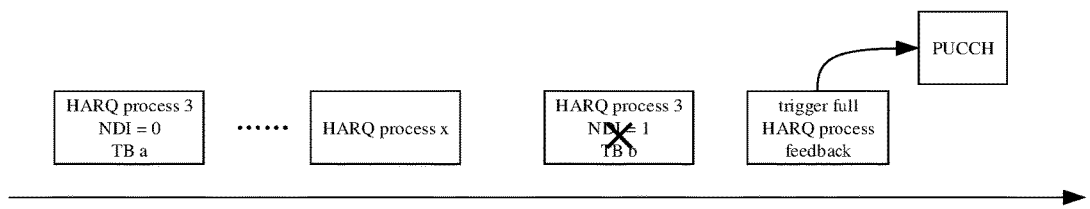
FIG. 1B is a diagram of another example of triggering full HARQ process feedback provided by an embodiment of the present disclosure.

As shown in FIG. 1B, the base station schedules HARQ process 3 to transmit TB a for the first time, and later schedules HARQ process 3 to transmit a new transmission block TB b. At this time, a New Data Information (NDI) information field in Downlink control information (DCI) that schedules this process is flipped compared to the previous one. The terminal only receives TB a, but does not receive TB b. When receiving the full HARQ process feedback, the terminal feeds back the ACK/NACK information corresponding to TB a for HARQ process 3, and the base station assumes that what the terminal sends is the ACK/NACK information corresponding to TB b. Since the process is rescheduled for data, it is usually the situation where TB a has been received correctly, which corresponds to ACK. The above ambiguity of understanding will cause the base station to deem that TB b is received correctly and will not retransmit it, resulting in data missing. The above ambiguity of understanding can be avoided by means of NDI information. For example, the base station further indicates the NDI information corresponding to each HARQ process when triggering the full HARQ process feedback, or the terminal reports the NDI information of each process to the base station when reporting the ACK/NACK information.

Figure 1C:
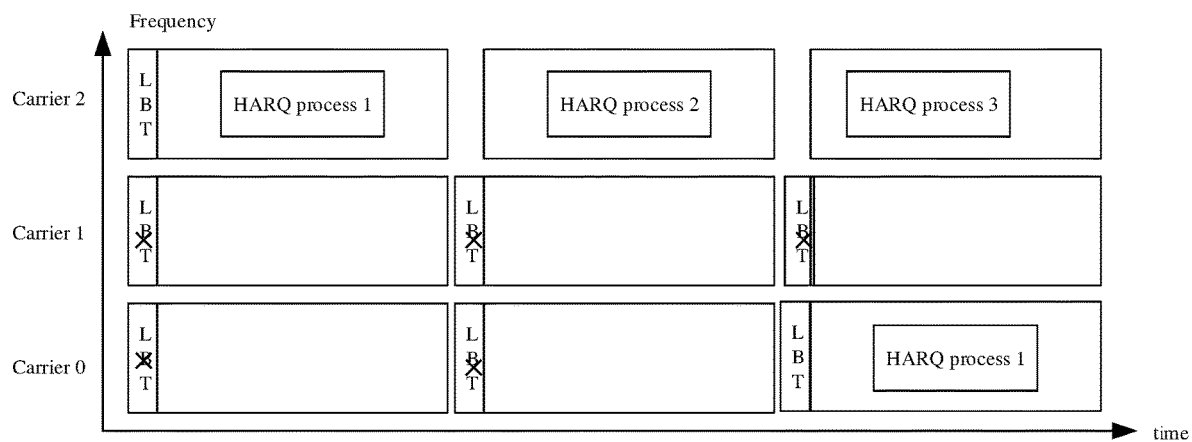
FIG. 1C is a diagram of an example of an unsuccessful LBT in a multi-carrier full HARQ process feedback process provided by an embodiment of the present disclosure.

When the terminal is configured to use multiple carriers for data transmission (i.e., carrier aggregation), the HARQ processes on each carrier are separately configured. Currently, each carrier supports up to 16 HARQ processes. When multiple NR-U carriers are configured for the terminal for data transmission:

1. If it is the full HARQ process feedback, the terminal is required to feed back all the ACK/NACK feedback information of the HARQ processes contained in all carriers, and the number of bits of the feedback information in a single transmission is very large, which will affect the reliability of the transmission. And:

2. Since it needs to perform separate listen-before-speak LBT on each carrier, during the data transmission process, there may be a situation where the LBT of a certain carrier is successful and data transmission is performed while LBTs of other carriers are not successful and data transmission cannot be performed. If the full HARQ process feedback is directly performed at this time, there will be a large amount of redundant information in the feedback information. As shown in FIG. 1C, it is assumed that the terminal transmits data through three carriers, and the three carriers are carrier 0, carrier 1, and carrier 2. In the data transmission process, the LBT of carrier 1 is not successful in all slots and the LBT of carrier 0 is not successful in the first two slots while the LBT of carriers 2 is successful and data transmission is performed. At this time, if the full HARQ process feedback is directly performed, it will result in redundant information in part of the feedback information corresponding to carrier 0 and carrier 1.

Figure 1D:
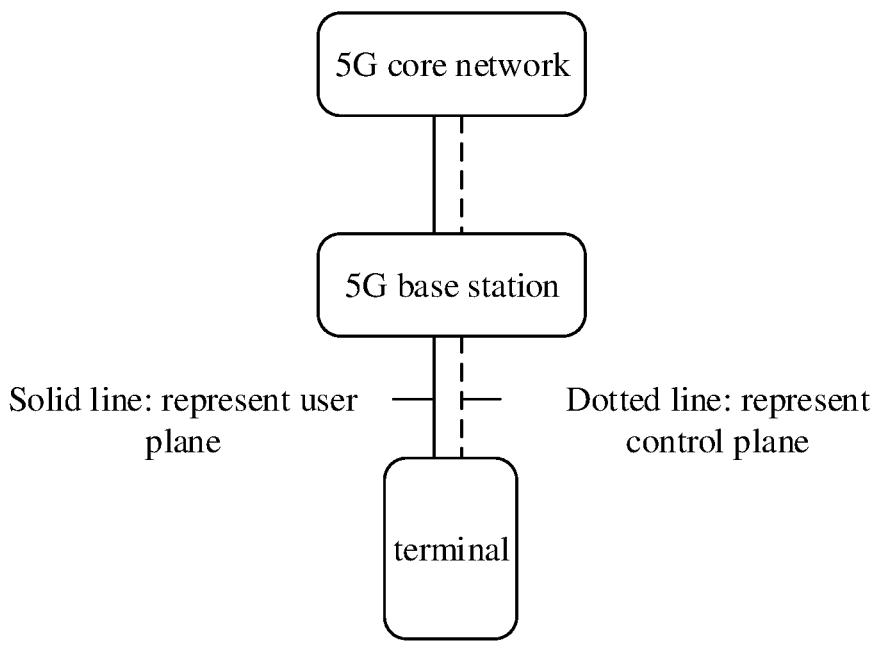
FIG. 1D is an exemplary diagram of a communication system of a 5G SA networking architecture provided by an embodiment of the present disclosure.
Figure 1E:
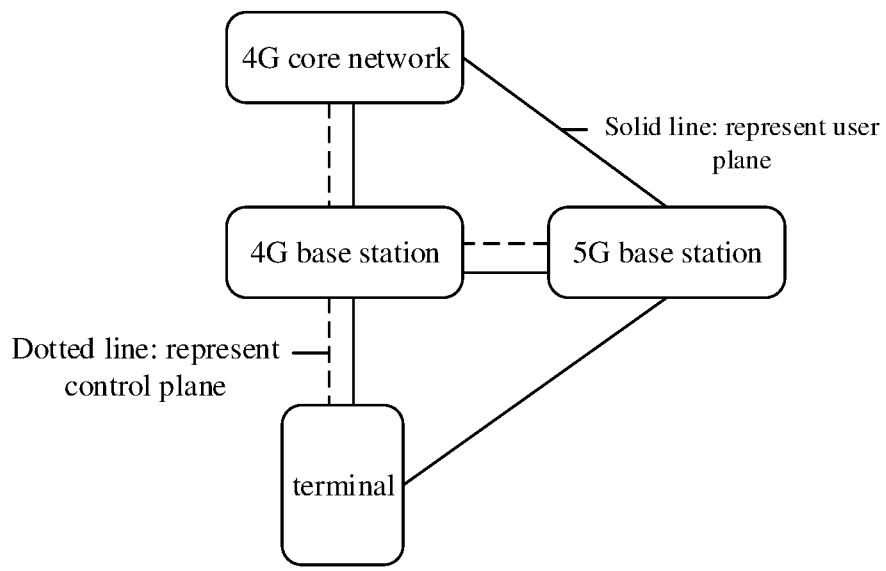
FIG. 1E is an exemplary diagram of a communication system of a 5G NSA networking architecture provided by an embodiment of the present disclosure.

In view of the foregoing problems, embodiments of the present disclosure propose a feedback information processing method, which is applied to a 5G NR networking architecture. The networking architecture can be a non-standalone (NSA) networking communication network as shown in FIG. 1D, or a standalone networking communication network as shown in FIG. 1E, which is not uniquely limited in the embodiments of the present disclosure. In addition, the terminal described in the embodiments of the present disclosure may include various handheld devices, vehicle-mounted devices, wearable devices (such as smart watches, smart bracelets, pedometers, etc.) or computing devices that have wireless communication functions, or other processing devices connected to wireless modems, as well as various forms of user equipment (UE), mobile station (MS) and so on. For ease of description, the devices mentioned above are collectively referred to as terminals. The network device described in the embodiments of the present disclosure includes a base station, a core network device, or the like.

Figure 2A:
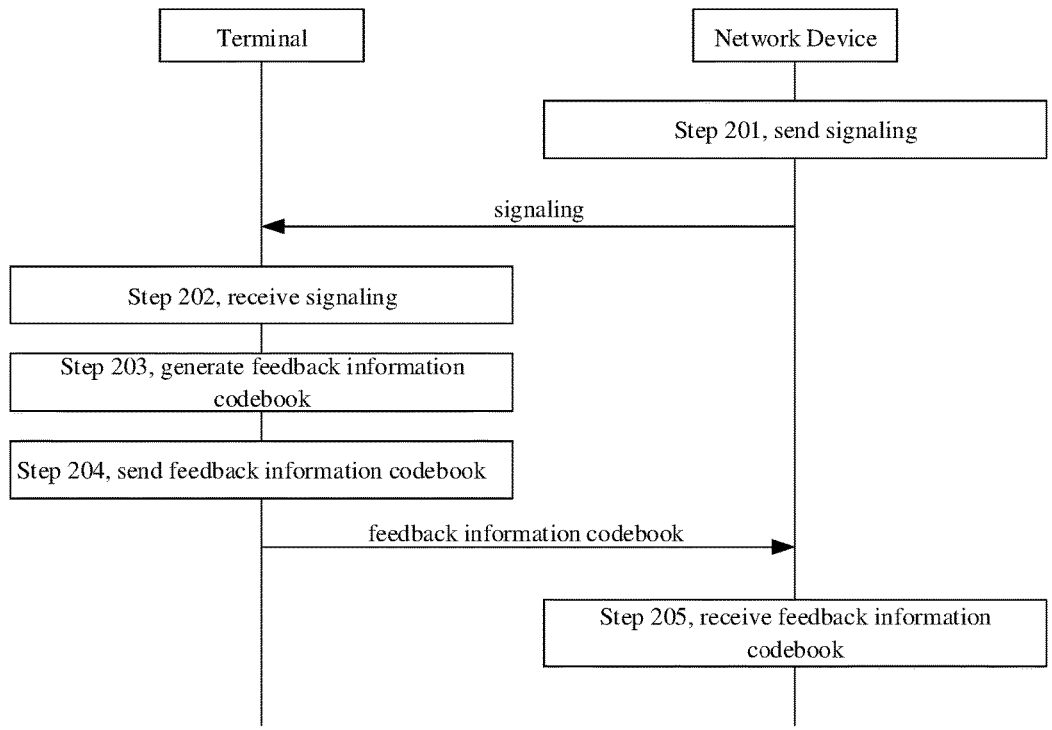
FIG. 2A is a schematic flowchart of a feedback information processing method provided by an embodiment of the present disclosure.

Please refer to FIG. 2A. FIG. 2A shows a feedback information processing method provided by an embodiment of the present disclosure, which is applied to a 5G SA or NSA networking system, and the method includes the following.

At step 201, a network device sends signaling that is used for a terminal to determine at least one carrier of N carriers, where N is a positive integer.

The signaling may be downlink control information DCI.

The N carriers may be new radio unlicensed spectrum (NR-U) carriers configured for the terminal.

In a specific implementation, the terminal can use the N carriers to perform data transmission through carrier aggregation technology, which is not uniquely limited here.

At step 202, the terminal receives the signaling that is used for the terminal to determine at least one carrier of the N carriers, where N is a positive integer.

At step 203, the terminal generates a feedback information codebook, where the feedback information codebook includes feedback information corresponding to all hybrid automatic repeat request HARQ processes within the at least one carrier of the N carriers.

The feedback information codebook is called a HARQ-ACK codebook in the standard protocol.

At step 204, the terminal sends the feedback information codebook.

At step 205, the network device receives the feedback information codebook from the terminal, where the feedback information codebook includes feedback information corresponding to all the hybrid automatic repeat request HARQ processes within the at least one carrier of the N carriers.

It can be seen that, in the embodiments of the present disclosure, the terminal is in communication connection with the network device, and the terminal is configured with N carriers. The terminal performs signaling interaction with the network device, generates a feedback information codebook, and exchanges the feedback information code with the network device. Here, the signaling is used to indicate at least one carrier of the N carriers, and the feedback information codebook includes feedback information corresponding to all HARQ processes in the at least one carrier of the N carriers. It can be seen that the embodiments of the present disclosure provide a mechanism for implementing full HARQ process feedback without feeding back the feedback information for the HARQ processes included in all the N carriers, which is beneficial to reduce the number of bits of the feedback information codebook in a single transmission and increase transmission reliability of the feedback information codebook.

In a possible example, the signaling includes carrier indication information, an indication range of the carrier indication information includes the N carriers, and the carrier indication information is used to indicate the at least one carrier.

In a specific implementation, the carrier indication information can be implemented by a carrier indication information triggering field in the signaling.

For example, it is assumed that the carrier indication information triggering field is an N-bit bitmap field, and specifically corresponds to N component carriers in an ascending order of carrier indexes of the carriers. When a corresponding bit position is 1, the carrier is triggered for full HARQ process feedback.

Figure 2B:
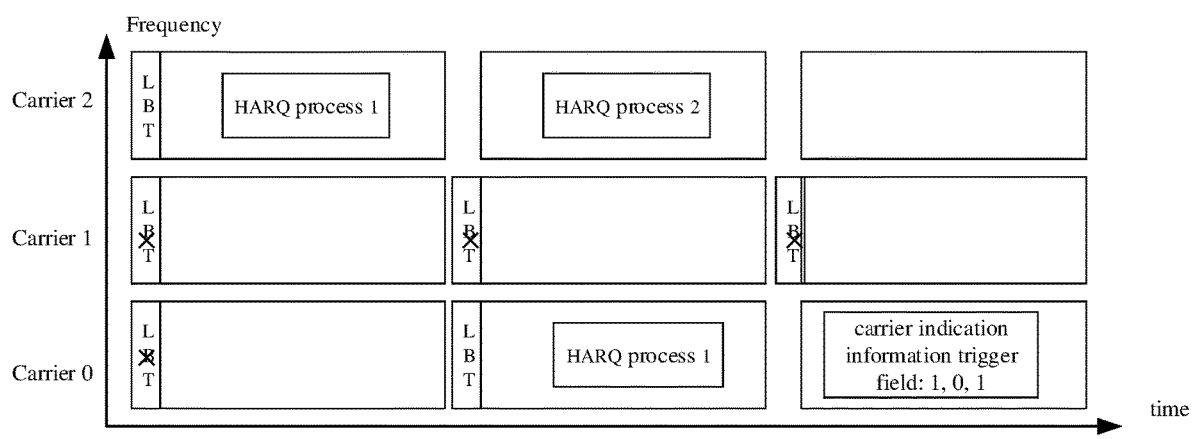
FIG. 2B is a diagram of an example of triggering full HARQ process feedback provided by an embodiment of the present disclosure.

As shown in the example shown in FIG. 2B, the signaling instructs the terminal to transmit the feedback information of the full HARQ processes corresponding to carrier 0 and carrier 2, and a field value of the corresponding carrier indication information triggering field is 1, 0, 1.

It can be seen that, in this example, since the indication range of the carrier indication information in the signaling exchanged between the terminal and the network device includes the N carriers, the information field only needs N bits to accurately indicate whether the full HARQ process feedback is performed for all the carriers, which is a flexible indication manner.

In a possible example, the signaling includes carrier indication information, and the carrier indication information is used to indicate a first carrier set including the at least one carrier among a plurality of carrier sets.

The carriers included in any two carrier sets of the plurality of carrier sets are not completely the same.

In a specific implementation, the carrier indication information can be implemented by a carrier indication information triggering field in the signaling.

For example, assuming that the carrier indication information triggering field is a 1-bit field, b0, the carriers, that are triggered for feedback, corresponding to different values of the field b0 include the following two types: a carrier where the trigger signaling is located; and all component carriers, as shown in the table 1, which shows an example of the mapping relationship for full-process HARQ feedback based on component carrier groups.

TABLE 1

| Carrier indication information triggering field b0 | Carrier triggered for feedback |
| --- | --- |
| 0 | Carrier where triggering signaling is located |
| 1 | All component carriers |

For another example, assuming that the carrier indication information triggering field is a 2-bit field, b0b1, then the carriers that are triggered for feedback corresponding to different values of the field b0b1 include the following four types: a carrier where the trigger signaling is located; a carrier set 1; a carrier set 2; and all component carriers, specifically as shown in Table 2, which shows an example of the mapping relationship for the full-process HARQ feedback based on component carrier groups.

TABLE 2

| Carrier indication information triggering field b0, b1 | Carrier triggered for feedback |
| --- | --- |
| 00 | Carrier where triggering signaling is located |
| 01 | Carrier set 1 |
| 10 | Carrier set 2 |
| 11 | All component carriers |

When there is data transmission on some but not all carriers in a certain carrier set, in order to take into account that the feedback information corresponding to other carriers with data transmission can be transmitted, the network device will still trigger the full HARQ process feedback for the carrier set, so there will also be some feedback redundancy.

It can be seen that, in this example, the carrier aggregation method is used to indicate the trigger conditions corresponding to the N component carriers, and the signaling overhead is less than N bits, and thus the signaling overhead for triggering feedback is relatively small.

In a possible example, a configuration of at least one carrier included in the first carrier set of the plurality of carrier sets includes any one of the following: being predetermined by a protocol; and being configured by high-layer signaling.

The configuration method of the foregoing mapping relationship is not uniquely limited in the embodiments of the present disclosure.

For example, as shown in Table 1, the carriers corresponding to the values 0 and 1 of the carrier indication information triggering field b0 can be predetermined by the protocol.

For another example, as shown in Table 2, for the values of the carrier indication information triggering field b0b1, the carriers corresponding to a state of 00 and a state of 11 can be predetermined by the protocol, and the carriers corresponding to a state of 01 and a state of 10 can be configured by high-level signaling.

For another example, as shown in Table 2, for the values of the carrier indication information triggering field b0b1, the carriers corresponding to the four states of 00 to 11 are all configured by high-level signaling.

In this possible example, the carrier included in the first carrier set is a first carriers; or the first carrier set includes all carriers; or the first carrier set includes all activated carriers.

In a possible example, the signaling includes carrier indication information, and the indication range of the carrier indication information includes N−1 carriers, where the N−1 carriers refer to all carriers other than the first carrier in the N carriers.

In a specific implementation, the carrier indication information can be implemented by a carrier indication information triggering field in the signaling.

The carrier indication information triggering field may be an field of N−1 bits, and the field of the N−1 bits corresponds to N−1 carriers other than the first carrier (that is, the carrier where the signaling is located) in the N carriers in an ascending order of the carrier indexes of the carriers. When a bit position corresponding to a carrier in the other N−1 carriers is 1, the full HARQ process feedback is triggered for the carrier, and the full HARQ process feedback is always triggered for the first carrier.

Figure 2C:
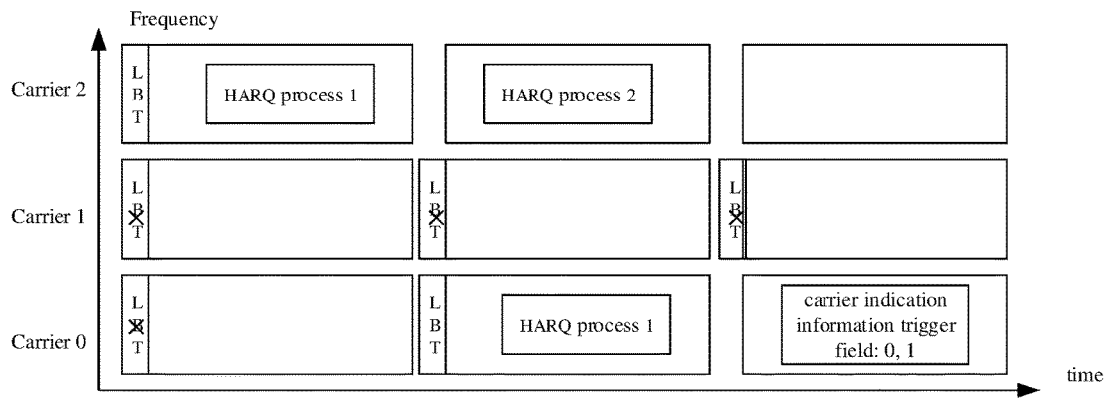
FIG. 2C is a diagram of another example of triggering full HARQ process feedback provided by an embodiment of the present disclosure.

As shown in the example shown in FIG. 2C, the signaling is transmitted in the third slot of carrier 0, and the value of the carrier indication information triggering field in the signaling is 01, which specifically indicates that the terminal is instructed to transmit full HARQ process feedback information corresponding to carrier 0 and carrier 2, and the full HARQ process feedback is triggered by default for the first carrier, carrier 0.

If the position of the transmission carrier for the signaling is limited, feedback redundancy can be avoided, otherwise there will still be feedback redundancy problems, but from the perspective of the implementation of the network device scheduling, it is reasonable to restrict the trigger signaling to be transmitted in the carrier with downlink channel transmission, and thus this restriction will not have a significant impact on the system.

It can be seen that in this example, since the field length of the signaling is N−1, the overhead is relatively reduced (1 bit reduced), and the indication method is flexible.

In this possible example, the at least one carrier includes a first carrier.

In a possible example, the first carrier includes any one of the following: a carrier used for transmitting the signaling; a carrier corresponding to a control resource set COREST used for transmitting the signaling, where the downlink control signaling DCI transmitted in the COREST is used to schedule a physical channel in the first carrier; a carrier corresponding to a search space used for transmitting the signaling, where the downlink control signaling DCI transmitted in the search space is used to schedule a physical channel in the first carrier; and a carrier transmitting a first downlink channel, where the first downlink channel is a downlink channel that is scheduled for transmission by the signaling simultaneously.

The transmission includes receiving and sending, which is receiving for the terminal and sending for the network device.

In a possible example, the feedback information codebook further includes the feedback information corresponding to the HARQ processes carried by the physical downlink channels for which receiving time is within a first time period.

If the network device schedules the same HARQ process multiple times in the first time period, and the terminal does not receive the last scheduling, it will still cause ambiguity in understanding, but such a scheduling situation can be avoided by the network device.

It can be seen that, in this example, the full HARQ process feedback mechanism does not need to rely on indicating NDI or reporting NDI in the signaling as mentioned above (as shown in FIG. 1B), which can reduce ambiguity in the understanding of the HARQ process between the terminal and the network device, and reduce overhead of the downlink control signaling or uplink control signaling.

In addition, if the terminal does not receive any HARQ process within the first time period, the terminal may not generate the feedback information codebook or not send the feedback information codebook.

In this possible example, the first time period is determined according to a transmission position of the signaling.

The first time period may be determined according to a starting position of a physical downlink channel carrying the signaling.

Figure 2D:
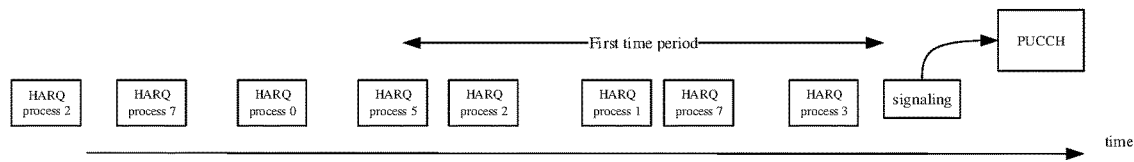
FIG. 2D is an exemplary diagram of a first time period for triggering full HARQ process feedback according to an embodiment of the present disclosure.

In the example shown in FIG. 2D, a time period T before the start position of the physical downlink channel that specifically carries the signaling is the first time period. In this example, HARQ process 5, HARQ process 2, HARQ process 1, HARQ process 7, and HARQ process 3 are included. The value of T is predetermined by a protocol, or configured by the base station through higher layer signaling, or indicated by the trigger signaling.

In this possible example, the first time period is determined according to a position of a time-frequency resource of a physical uplink channel carrying the feedback information codebook.

The first time period may be determined according to a starting position of a physical uplink channel carrying the current full HARQ process feedback.

A difference between an ending position of the first time period and a start position of the physical uplink channel carrying the current full HARQ process feedback is not less than a first threshold, where the first threshold is predetermined by the base station or the protocol, and the physical meaning of the first threshold is a minimum processing delay for the terminal to receive a physical downlink channel, complete demodulation and generate corresponding ACK/NACK feedback information.

Figure 2E:
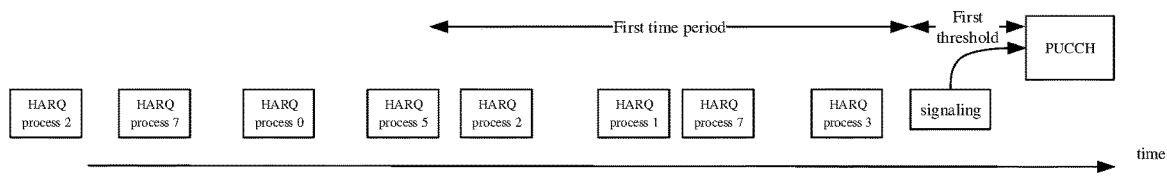
FIG. 2E is an exemplary diagram of another first time period for triggering full HARQ process feedback according to an embodiment of the present disclosure.

In the example shown in FIG. 2E, the time period T before a position of the starting position of the physical uplink channel that specifically carries the current full HARQ process feedback plus the first threshold is the first time period. In this example, HARQ process 5, HARQ process 2, HARQ process 1, HARQ process 7 and HARQ process 3 are included. The value of T is predetermined by a protocol, configured by the base station through higher layer signaling, or indicated by the trigger signaling.

In this possible example, a transmission ending position of the physical downlink channel is within the first time period.

In this possible example, the feedback information in the feedback information codebook corresponding to the HARQ process that is not received within the first time period is a negative acknowledgement NACK.

In this possible example, the HARQ process carried by the physical downlink channel that is received in the first time period includes a first HARQ process, and the number of transmissions of the first HARQ process in the first time period is greater than 1; a bit corresponding to the first HARQ process in the feedback information codebook is determined by the feedback information corresponding to the first HARQ process with the latest transmission time.

In a possible example, the feedback information corresponding to the at least one carrier is mapped in the feedback information codebook in an ascending order of carrier indexes, and the feedback information corresponding to each carrier is mapped in an ascending order of HARQ processes.

A detailed description will be given below in conjunction with specific examples.

Figure 2F:
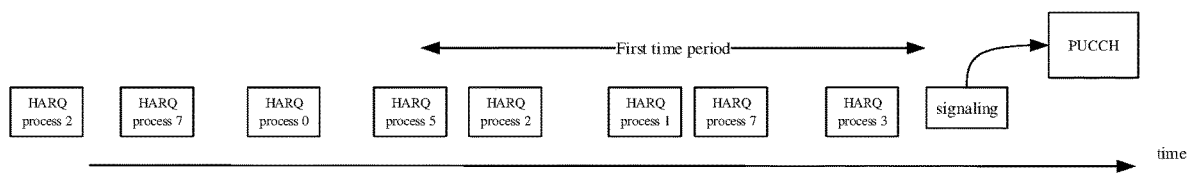
FIG. 2F is a diagram of an example of triggering full HARQ process feedback provided by an embodiment of the present disclosure.

As shown in FIG. 2F, assuming that the terminal is configured with one component carrier, the component carrier supports a maximum of 8 HARQ processes, and the process numbers are 0-7. The terminal receives the signaling, and determines that the HARQ process 5, the HARQ process 2, the HARQ process 1, the HARQ process 7, and the HARQ process 3 are sequentially received within the first time period. Then the terminal generates the feedback codebook for this full HARQ process feedback as {NACK, b1, b2, b3, NACK, b5, NACK, b7}, where bi is the ACK/NACK information corresponding to HARQ process i, and is specifically ACK or NACK obtained according to the decoding result of the process.

Figure 2G:
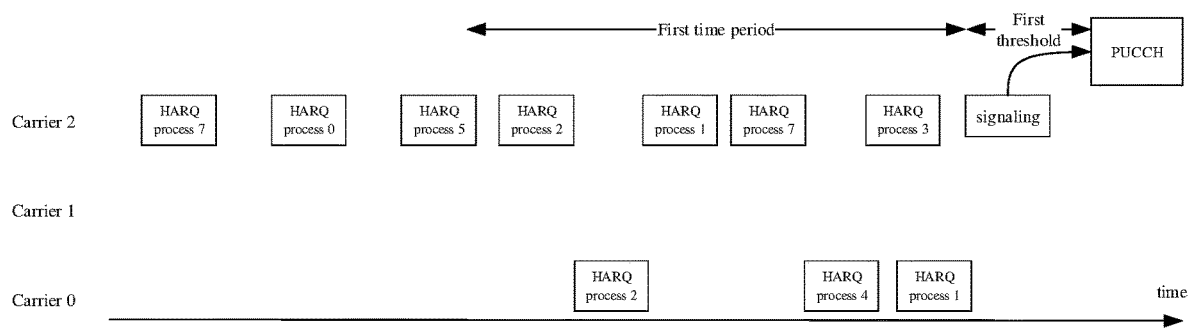
FIG. 2G is a diagram of another example of triggering full HARQ process feedback provided by an embodiment of the present disclosure.

As shown in FIG. 2G, it is assumed that the terminal is configured with 3 component carriers, and each component carrier supports a maximum of 8 HARQ processes. The terminal receives the signaling and determines to perform the full HARQ process feedback in the first time period on carrier 0 and carrier 2. Then the terminal generates the feedback codebook for this full HARQ process feedback as {$NACK_{CC0,HARQ0}$, $b_{CC0,HARQ1}$, $b_{CC0,HARQ2}$, $NACK_{CC0,HARQ3}$, $b_{CC0,HARQ4}$, $NACK_{CC0,HARQ5}$, $NACK_{CC0,HARQ6}$, $NACK_{CC0,HARQ7}$, $NACK_{CC2,HARQ0}$, $b_{CC2,HARQ1}$, $b_{CC2,HARQ2}$, $b_{CC2,HARQ3}$, $NACK_{CC2,HARQ6}$, $b_{CC2,HARQ4}$, $NACK_{CC2,HARQ6}$, $b_{CC2,HARQ7}$}, where $NACK_{CCq,HARQp}$ is the NACK placeholder information corresponding to HARQ process p on carrier q, and $b_{CCi,HARQj}$ is the ACK/NACK information corresponding to HARQ process j on carrier i, which is specifically ACK or NACK obtained according to the decoding result of the process.

Figure 3:
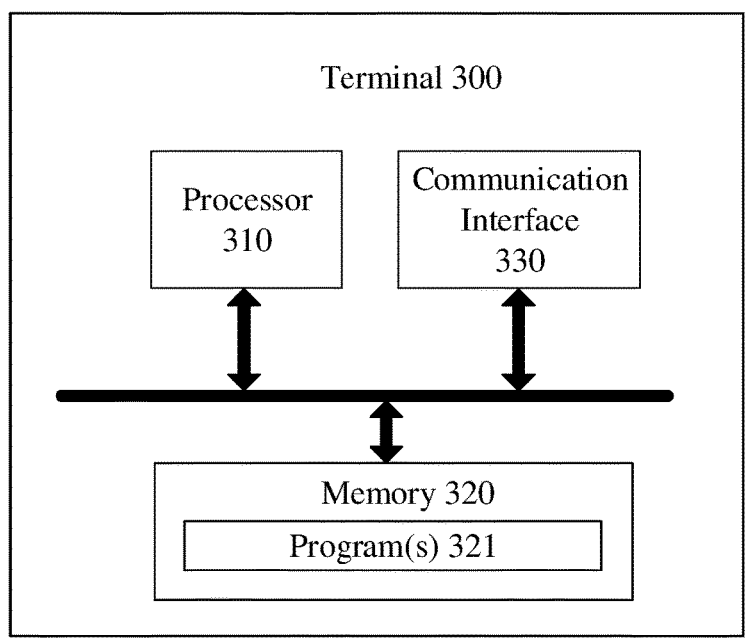
FIG. 3 is a schematic structural diagram of a terminal provided by an embodiment of the present disclosure.

Consistent with the embodiment shown in FIG. 2A, please refer to FIG. 3, which is a schematic structural diagram of a terminal 300 provided by an embodiment of the present disclosure. As shown, the terminal 300 includes a processor 310, a memory 320, a communication interface 330 and one or more programs 321, the one or more programs 321 are stored in the above-mentioned memory 320 and are configured to be executed by the above-mentioned processor 310, and the one or more programs 321 include instructions for performing the following operations: receiving signaling, where the signaling is used for the terminal to determine at least one carrier of N carriers, where N is a positive integer; and generating a feedback information codebook, where the feedback information codebook includes feedback information corresponding to all hybrid automatic repeat request HARQ processes within the at least one carrier of the N carriers.

It can be seen that, in the embodiments of the present disclosure, the terminal is in communication connection with the network device, and the terminal is configured with N carriers. The terminal performs signaling interaction with the network device, generates a feedback information codebook, and exchanges the feedback information code with the network device. Here, the signaling is used to indicate at least one carrier of the N carriers, and the feedback information codebook includes feedback information corresponding to all HARQ processes in the at least one carrier of the N carriers. It can be seen that the embodiments of the present disclosure provide a mechanism for implementing full HARQ process feedback without feeding back the feedback information for the HARQ processes included in all the N carriers, which is beneficial to reduce the number of bits of the feedback information codebook in a single transmission and increase transmission reliability of the feedback information codebook.

In a possible example, the signaling includes carrier indication information, an indication range of the carrier indication information includes the N carriers, and the carrier indication information is used to indicate the at least one carrier.

In a possible example, the signaling includes carrier indication information, and the carrier indication information is used to indicate a first carrier set including the at least one carrier among a plurality of carrier sets.

In a possible example, a configuration of at least one carrier included in the first carrier set of the plurality of carrier sets includes any one of the following: being predetermined by a protocol; and being configured by high-layer signaling.

In a possible example, the carrier included in the first carrier set is a first carriers; or the first carrier set includes all carriers; or the first carrier set includes all activated carriers.

In a possible example, the signaling includes carrier indication information, and the indication range of the carrier indication information includes N−1 carriers, where the N−1 carriers refer to all carriers other than the first carrier in the N carriers.

In a possible example, the at least one carrier includes the first carrier.

In a possible example, the first carrier includes any one of the following: a carrier used for receiving the signaling; a carrier corresponding to a control resource set COREST used for receiving the signaling, where the downlink control signaling DCI transmitted in the COREST is used to schedule a physical channel in the first carrier; a carrier corresponding to a search space used for receiving the signaling, where the downlink control signaling DCI transmitted in the search space is used to schedule a physical channel in the first carrier; and a carrier receiving a first downlink channel, where the first downlink channel is a downlink channel which is scheduled for transmission by the signaling simultaneously.

In a possible example, the feedback information codebook further includes the feedback information corresponding to the HARQ processes carried by the physical downlink channels for which receiving time is within a first time period.

In a possible example, the first time period is determined according to a transmission position of the signaling.

In a possible example, the first time period is determined according to a position of a time-frequency resource of a physical uplink channel carrying the feedback information codebook.

In a possible example, a transmission ending position of the physical downlink channel is within the first time period.

In a possible example, the feedback information in the feedback information codebook corresponding to the HARQ process that is not received within the first time period is a negative acknowledgement NACK.

In a possible example, the HARQ process carried by the physical downlink channel that is received in the first time period includes a first HARQ process, the number of transmissions of the first HARQ process in the first time period is greater than 1, and a bit corresponding to the first HARQ process in the feedback information codebook is determined by the feedback information corresponding to the first HARQ process with the latest transmission time.

In a possible example, the feedback information corresponding to the at least one carrier is mapped in the feedback information codebook in an ascending order of carrier indexes, and the feedback information corresponding to each carrier is mapped in an ascending order of HARQ processes.

Figure 4:
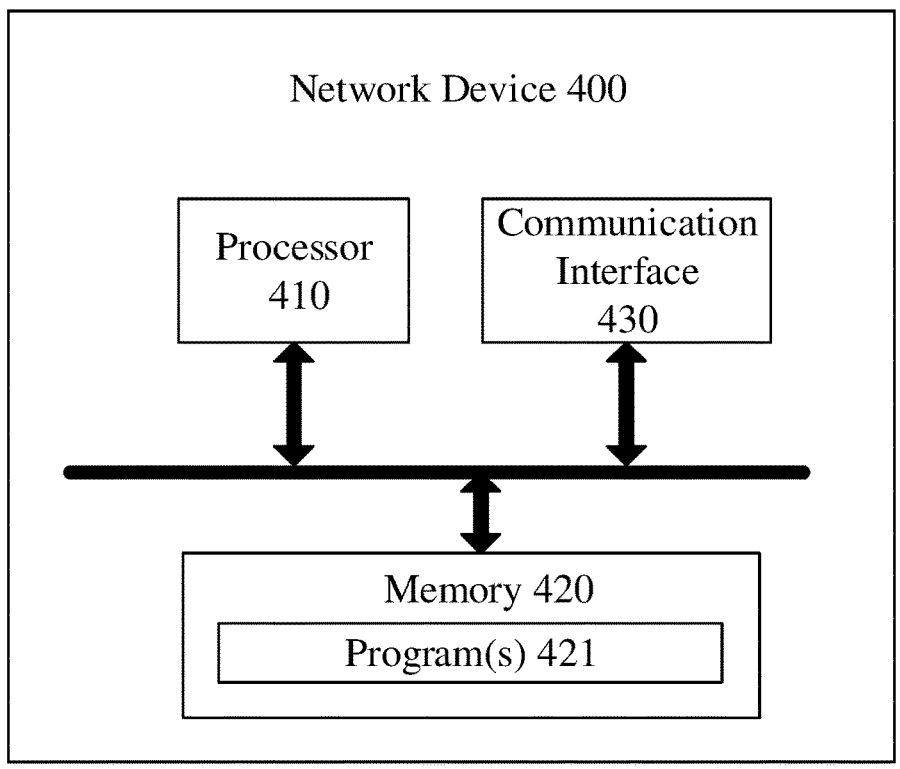
FIG. 4 is a schematic structural diagram of a network device provided by an embodiment of the present disclosure.

Please refer to FIG. 4, which is a schematic structural diagram of a network device 400 provided by an embodiment of the present disclosure. As shown, the network device 400 includes a processor 410, a memory 420, a communication interface 430, and one or more programs 421, the one or more programs 421 are stored in the foregoing memory 420 and configured to be executed by the foregoing processor 410, and the one or more programs 421 include instructions for performing the following operations: sending signaling, where the signaling is used for a terminal to determine at least one carrier of N carriers, where N is a positive integer; and receiving a feedback information codebook from the terminal, where the feedback information codebook includes feedback information corresponding to all hybrid automatic repeat request HARQ processes within the at least one carrier of the N carriers.

It can be seen that, in the embodiments of the present disclosure, the terminal is in communication connection with the network device, and the terminal is configured with N carriers. The terminal performs signaling interaction with the network device, generates a feedback information codebook, and exchanges the feedback information code with the network device. Here, the signaling is used to indicate at least one carrier of the N carriers, and the feedback information codebook includes feedback information corresponding to all HARQ processes in the at least one carrier of the N carriers. It can be seen that the embodiments of the present disclosure provide a mechanism for implementing full HARQ process feedback without feeding back the feedback information for the HARQ processes included in all the N carriers, which is beneficial to reduce the number of bits of the feedback information codebook in a single transmission and increase transmission reliability of the feedback information codebook.

In a possible example, the signaling includes carrier indication information, an indication range of the carrier indication information includes the N carriers, and the carrier indication information is used to indicate the at least one carrier.

In a possible example, the signaling includes carrier indication information, and the carrier indication information is used to indicate a first carrier set including the at least one carrier among a plurality of carrier sets.

In a possible example, a configuration of at least one carrier included in the first carrier set of the plurality of carrier sets includes any one of the following: being predetermined by a protocol; and being configured by high-layer signaling.

In a possible example, the carrier included in the first carrier set is a first carrier; or the first carrier set includes all carriers; or the first carrier set includes all activated carriers.

In a possible example, the signaling includes carrier indication information, and the indication range of the carrier indication information includes N−1 carriers, where the N−1 carriers refer to all carriers other than the first carrier in the N carriers.

In a possible example, the at least one carrier includes the first carrier.

In a possible example, the first carrier includes any one of the following: a carrier used for sending the signaling; a carrier corresponding to a control resource set COREST used for sending the signaling, where the downlink control signaling DCI transmitted in the COREST is used to schedule a physical channel in the first carrier; a carrier corresponding to a search space used for sending the signaling, where the downlink control signaling DCI transmitted in the search space is used to schedule a physical channel in the first carrier; and a carrier sending a first downlink channel, where the first downlink channel is a downlink channel which is scheduled for transmission by the signaling simultaneously.

In a possible example, the feedback information codebook is mapped with feedback information corresponding to the HARQ process carried by the physical downlink channel that is received in the first time period.

In a possible example, the first time period is determined according to a transmission position of the signaling.

In a possible example, the first time period is determined according to a position of a physical uplink channel carrying the feedback information codebook.

In a possible example, a transmission ending position of the physical downlink channel is within the first time period.

In a possible example, the feedback information in the feedback information codebook corresponding to the HARQ process that is not received within the first time period is negative acknowledgement NACK.

In a possible example, the HARQ process carried by the physical downlink channel that is received in the first time period includes a first HARQ process, the number of transmissions of the first HARQ process in the first time period is greater than 1, and the bit corresponding to the first HARQ process in the feedback information codebook is determined by the feedback information corresponding to the first HARQ process with the latest transmission time.

In a possible example, the feedback information corresponding to the at least one carrier is mapped in the feedback information codebook in an ascending order of carrier indexes, and the feedback information corresponding to each carrier is mapped in an ascending order of HARQ processes.

The technical solutions of the embodiments of the present disclosure are described above mainly from the perspective of interaction between the network elements. It can be understood that, in order to realize the above-mentioned functions, the terminal includes hardware structures and/or software modules for performing corresponding functions. Those skilled in the art should easily realize that in combination with the units and algorithm steps of the examples described in the embodiments disclosed herein, the present disclosure can be implemented in the form of hardware or a combination of hardware and computer software. Whether a certain function is executed by hardware or computer software-driven hardware depends on the specific application and design constraint conditions of the technical solution. Professionals and technicians can use different methods for each specific application to implement the described functions, and such implementation should not be considered as going beyond the scope of the present disclosure.

In the embodiments of the present disclosure, functional units of the terminal may be divided according to the foregoing method examples. For example, the respective functional units may be divided corresponding to each function, or two or more functions may be integrated into one processing unit. The above-mentioned integrated unit can be implemented in the form of hardware or software program module. It should be noted that the division of units in the embodiments of the present disclosure is illustrative, and is only a logical function division, and there may be other division methods in actual implementations.

Figure 5:
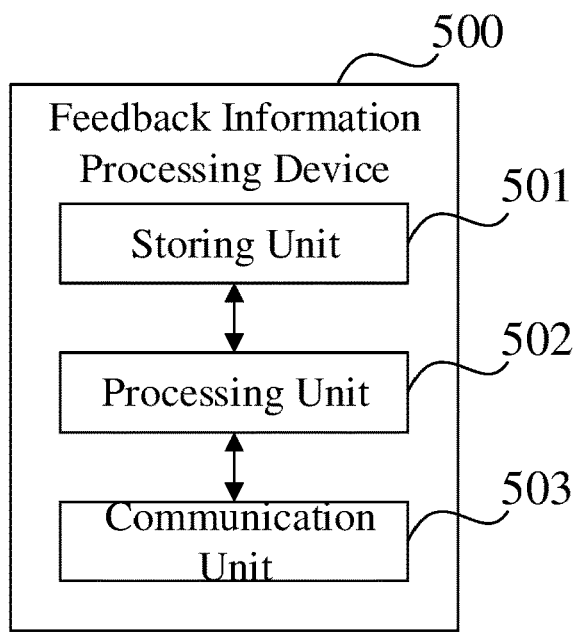
FIG. 5 is a composition block diagram of functional units of a device provided by an embodiment of the present disclosure.

In the case of using integrated units, FIG. 5 shows a block diagram of a possible functional unit composition of the uplink control information multiplexing transmission device involved in the foregoing embodiments. The uplink control information multiplexing transmission device 500 is applied to a terminal, and specifically includes a processing unit 502 and a communication unit 503. The processing unit 502 is configured to control and manage the actions of the terminal. For example, the processing unit 502 is configured to support steps 202 and 203 in FIG. 2A performed by the terminal and/or other processes in the technology described herein. The communication unit 503 is configured to support communication between the terminal and other devices. The terminal may also include a storage unit 501 for storing program codes and data of the terminal.

The processing unit 502 may be a processor or a controller, for example, a central processing unit (CPU), a general-purpose processor, a digital signal processor (DSP), an application-specific integrated circuit (ASIC), a Field Programmable Gate Array (FPGA) or other programmable logic devices, transistor logic devices, hardware components or any combination thereof, which can implement or execute various exemplary logical blocks, modules, and circuits described in conjunction with the disclosure of this disclosure. The processor may also be a combination for realizing computing functions, for example, including a combination of one or more microprocessors, a combination of a DSP and a microprocessor, and so on. The communication unit 503 may be a communication interface, a transceiver, a transceiver circuit, etc., and the storage unit 501 may be a memory. When the processing unit 502 is a processor, the communication unit 503 is a communication interface, and the storage unit 501 is a memory, the terminal involved in the embodiments of the present disclosure may be the terminal as shown in FIG. 3.

In specific implementations, the processing unit 502 is configured to perform any step performed by the terminal in the foregoing method embodiments, and when performing data transmission such as sending of data, the communication unit 503 can be optionally invoked to complete the corresponding operation. The detailed description will be given below.

The processing unit 502 is configured to receive signaling through the communication unit 503, where the signaling is used for the terminal to determine at least one carrier of N carriers, where N is a positive integer; and to generate a feedback information codebook, where the feedback information codebook includes feedback information corresponding to all hybrid automatic repeat request HARQ processes within the at least one carrier of the N carriers.

In a possible example, the signaling includes carrier indication information, an indication range of the carrier indication information includes the N carriers, and the carrier indication information is used to indicate the at least one carrier.

In a possible example, the signaling includes carrier indication information, and the carrier indication information is used to indicate a first carrier set including the at least one carrier among a plurality of carrier sets.

In a possible example, a configuration of at least one carrier included in the first carrier set of the plurality of carrier sets includes any one of the following: being predetermined by a protocol; and being configured by high-layer signaling.

In a possible example, the carrier included in the first carrier set is a first carrier; or the first carrier set includes all carriers; or the first carrier set includes all activated carriers.

In a possible example, the signaling includes carrier indication information, and the indication range of the carrier indication information includes N−1 carriers, where the N−1 carriers refer to all carriers other than the first carrier in the N carriers.

In a possible example, the at least one carrier includes the first carrier.

In a possible example, the first carrier includes any one of the following: a carrier used for receiving the signaling; a carrier corresponding to a control resource set COREST used for receiving the signaling, where the downlink control signaling DCI transmitted in the COREST is used to schedule a physical channel in the first carrier; a carrier corresponding to a search space used for receiving the signaling, where the downlink control signaling DCI transmitted in the search space is used to schedule a physical channel in the first carrier; and a carrier receiving a first downlink channel, where the first downlink channel is a downlink channel that is scheduled for transmission by the signaling simultaneously.

In a possible example, the feedback information codebook further includes the feedback information corresponding to the HARQ processes carried by the physical downlink channels for which receiving time is within a first time period.

In a possible example, the first time period is determined according to a transmission position of the signaling.

In a possible example, the first time period is determined according to a position of a time-frequency resource of a physical uplink channel carrying the feedback information codebook.

In a possible example, a transmission ending position of the physical downlink channel is within the first time period.

In a possible example, the feedback information in the feedback information codebook corresponding to the HARQ process that is not received within the first time period is negative acknowledgement NACK.

In a possible example, the HARQ process carried by the physical downlink channel that is received in the first time period includes a first HARQ process, the number of transmissions of the first HARQ process in the first time period is greater than 1, and the bit corresponding to the first HARQ process in the feedback information codebook is determined by the feedback information corresponding to the first HARQ process with the latest transmission time.

In a possible example, the feedback information corresponding to the at least one carrier is mapped in the feedback information codebook in an ascending order of carrier indexes, and the feedback information corresponding to each carrier is mapped in an ascending order of HARQ processes.

Figure 6:
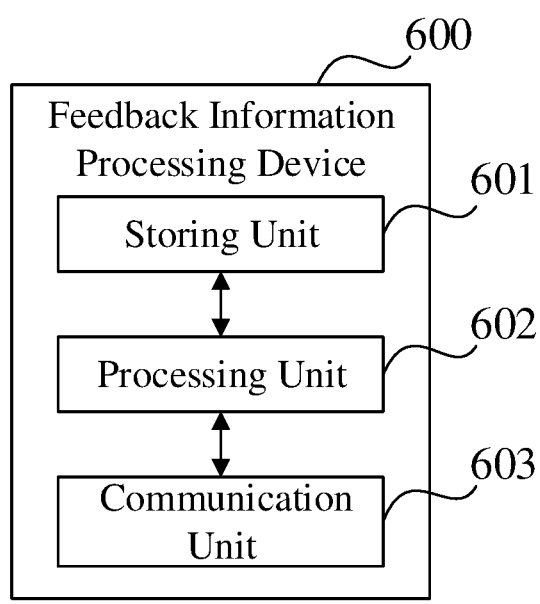
FIG. 6 is a composition block diagram of functional units of a device provided by an embodiment of the present disclosure.

In the case of using the integrated unit, FIG. 6 shows a block diagram of a possible functional unit composition of the uplink control information multiplexing transmission device involved in the foregoing embodiments. The uplink control information multiplexing transmission device 600 is applied to a network device, and the network device includes a processing unit 602 and a communication unit 603. The processing unit 602 is configured to control and manage the actions of the network device. For example, the processing unit 502 is configured to support steps 202 and 204 in FIG. 2A performed by the network device and/or other processes in the technology described herein. The communication unit 603 is configured to support communication between the network device and other devices. The network device may also include a storage unit 601 for storing program codes and data of the terminal.

The processing unit 602 may be a processor or a controller, for example, a central processing unit (CPU), a general-purpose processor, a digital signal processor (DSP), an application-specific integrated circuit (ASIC), a Field Programmable Gate Array (FPGA) or other programmable logic devices, transistor logic devices, hardware components or any combination thereof, which can implement or execute various exemplary logical blocks, modules, and circuits described in conjunction with this disclosure. The processor may also be a combination for realizing computing functions, for example, including a combination of one or more microprocessors, a combination of a DSP and a microprocessor, and so on. The communication unit 603 may be a communication interface, a transceiver, a transceiver circuit, etc., and the storage unit 601 may be a memory. When the processing unit 602 is a processor, the communication unit 603 is a communication interface, and the storage unit 601 is a memory, the terminal involved in the embodiments of the present disclosure may be the network device as shown in FIG. 4.

The processing unit 602 is configured to send signaling through the communication unit 603, where the signaling is used for a terminal to determine at least one carrier of N carriers, where N is a positive integer; and to receive a feedback information codebook from the terminal through the communication unit 603, where the feedback information codebook includes feedback information corresponding to all the hybrid automatic repeat request HARQ processes within the at least one carrier of the N carriers.

In a possible example, the signaling includes carrier indication information, an indication range of the carrier indication information includes the N carriers, and the carrier indication information is used to indicate the at least one carrier.

In a possible example, the signaling includes carrier indication information, and the carrier indication information is used to indicate a first carrier set including the at least one carrier among a plurality of carrier sets.

In a possible example, a configuration of at least one carrier included in the first carrier set of the plurality of carrier sets includes any one of the following: being predetermined by a protocol; and being configured by high-layer signaling.

In a possible example, the carrier included in the first carrier set is a first carrier; or the first carrier set includes all carriers; or the first carrier set includes all activated carriers.

In a possible example, the signaling includes carrier indication information, and the indication range of the carrier indication information includes N−1 carriers, where the N−1 carriers refer to all carriers other than the first carrier in the N carriers.

In a possible example, the at least one carrier includes the first carrier.

In a possible example, the first carrier includes any one of the following: a carrier used for sending the signaling; a carrier corresponding to a control resource set COREST used for sending the signaling, where the downlink control signaling DCI transmitted in the COREST is used to schedule a physical channel in the first carrier; a carrier corresponding to a search space used for sending the signaling, where the downlink control signaling DCI transmitted in the search space is used to schedule a physical channel in the first carrier; and a carrier sending a first downlink channel, where the first downlink channel is a downlink channel which is scheduled for transmission by the signaling simultaneously.

In a possible example, the feedback information codebook is mapped with feedback information corresponding to the HARQ process carried by the physical downlink channel that is received in the first time period.

In a example, the first time period is determined according to a transmission position of the signaling.

In a possible example, the first time period is determined according to a position of a physical uplink channel carrying the feedback information codebook.

In a possible example, a transmission ending position of the physical downlink channel is within the first time period.

In a possible example, the feedback information in the feedback information codebook corresponding to the HARQ process that is not received within the first time period is negative acknowledgement NACK.

In a possible example, the HARQ process carried by the physical downlink channel that is received in the first time period includes a first HARQ process, the number of transmissions of the first HARQ process in the first time period is greater than 1, and a bit corresponding to the first HARQ process in the feedback information codebook is determined by the feedback information corresponding to the first HARQ process with the latest transmission time.

In a possible example, the feedback information corresponding to the at least one carrier is mapped in the feedback information codebook in an ascending order of carrier indexes, and the feedback information corresponding to each carrier is mapped in an ascending order of HARQ processes.

The embodiments of the present disclosure also provide a chip, wherein the chip includes a processor, which is configured to call and run a computer program from a memory, to cause a device installed with the chip to perform part or all of the steps described for the terminal in the above method embodiments.

The embodiments of the present disclosure also provide a computer-readable storage medium, wherein the computer-readable storage medium stores a computer program for electronic data exchange, and the computer program causes a computer to perform part or all of the steps described for the terminal in the above method embodiments.

The embodiments of the present disclosure also provide a computer-readable storage medium, wherein the computer-readable storage medium stores a computer program for electronic data exchange, and the computer program causes a computer to perform part or all of the steps described for the network side device in the above method embodiments.

The embodiments of the present disclosure also provide a computer program product, wherein the computer program product includes a computer program, and the computer program is operable to cause a computer to perform part or all of the steps described for the terminal in the above method embodiments. The computer program product may be a software installation package.

The steps of the method or algorithm described in the embodiments of the present disclosure may be implemented in a form of hardware, or may be implemented in a form of a processor executing software instructions. The software instructions can be composed of corresponding software modules, which can be stored in a Random Access Memory (RAM), a flash memory, a Read Only Memory (ROM), an Erasable Programmable ROM (EPROM), an Electrically EPROM (EEPROM), a register, a hard disk, a portable hard disk, a CD-ROM, or any other form of storage medium known in the art. An exemplary storage medium is coupled to the processor, so that the processor can read information from the storage medium and can write information to the storage medium. Of course, the storage medium may also be an integral part of the processor. The processor and the storage medium may be located in the ASIC. In addition, the ASIC may be located in an access network device, a target network device, or a core network device. Of course, the processor and the storage medium may also exist as discrete components in the access network device, the target network device, or the core network device.

Those skilled in the art can recognize that in the above one or more examples, functions described in the embodiments of the present disclosure may be implemented entirely or partly by software, hardware, firmware or any combination thereof. When implemented by software, it can be implemented entirely or partly in the form of a computer program product. The computer program product includes one or more computer instructions. When the computer program instructions are loaded and executed on the computer, the processes or functions in accordance with the embodiments of the present disclosure are entirely or partly generated. The computer can be a general-purpose computer, a dedicated computer, a computer network, or other programmable devices. The computer instructions can be stored in a computer-readable storage medium, or transmitted from one computer-readable storage medium to another. For example, the computer instructions can be transmitted from a website, a computer, a server, or a data center to another website site, computer, server or data center in a wired manner such as through a coaxial cable, an optical fiber or a digital subscriber line (DSL) or in a wireless manner such as an infrared, wireless, microwave manner or the like. The computer-readable storage medium may be any available medium that can be accessed by a computer or a data storage device such as a server or data center integrated with one or more available media. The available medium may be a magnetic medium (such as a floppy disk, a hard disk, a magnetic tape), an optical medium (such as a DVD), a semiconductor medium (such as a solid state disk (SSD)), or the like.

In the specific implementations described above, the purpose, technical solutions, and beneficial effects of the embodiments of the disclosure are described in further detail. It should be understood that those described above are only specific implementations of the embodiments of the present disclosure, and are not intended to limit the protection scope of the embodiments of the present disclosure, any modification, equivalent replacement, improvement, etc. made on the basis of the technical solutions of the embodiments of the present disclosure shall fall within the protection scope of the embodiments of the present disclosure.

What is claimed is:

1. A method for feedback information processing, comprising:
receiving, by a terminal device, signaling that is used to determine at least one carrier of N carriers, wherein N is a positive integer; and
generating, by the terminal device, a feedback information codebook, wherein the feedback information codebook comprises feedback information corresponding to all hybrid automatic repeat request (HARQ) processes within the at least one carrier of the N carriers,
wherein the signaling comprises carrier indication information, an indication range of the carrier indication information comprises N−1 carriers, and the N−1 carriers refer to all carriers other than a first carrier in the N carriers,
wherein the first carrier comprises one of the following:
a carrier used for receiving the signaling;
a carrier corresponding to a control resource set (COREST) used for receiving the signaling, wherein downlink control information (DCI) transmitted in the COREST is configured to schedule a physical channel in the first carrier;

a carrier corresponding to a search space used for receiving the signaling, wherein DCI transmitted in the search space is configured to schedule a physical channel in the first carrier; and a carrier receiving a first downlink channel, wherein the first downlink channel is a downlink channel that is scheduled for transmission by the signaling, wherein the feedback information codebook further comprises feedback information corresponding to a HARQ process carried by a physical downlink channel received within a first time period, and wherein the first time period is determined according to a transmission position of the signaling.

2. The method according to claim 1, wherein the signaling comprises carrier indication information, and the carrier indication information is used to indicate a first carrier set including the at least one carrier among a plurality of carrier sets.

3. The method according to claim 2, wherein at least one carrier included in the first carrier set of the plurality of carrier sets is configured by high-level signaling.

4. The method according to claim 1, wherein the at least one carrier includes the first carrier.

5. The method according to claim 1, wherein a transmission ending position of the physical downlink channel is within the first time period.

6. The method according to claim 1, wherein the feedback information in the feedback information codebook corresponding to a HARQ process that is not received within the first time period is negative acknowledgement (NACK).

7. The method according to claim 1, wherein:
the HARQ process carried by the physical downlink channel that is received in the first time period comprises a first HARQ process, and a number of transmissions of the first HARQ process in the first time period is greater than 1; and
a bit corresponding to the first HARQ process in the feedback information codebook is determined by the feedback information corresponding to the first HARQ process with a latest transmission time.

8. The method according to claim 1, wherein the feedback information corresponding to the at least one carrier is mapped in the feedback information codebook in an ascending order of carrier indexes, and the feedback information corresponding to each carrier is mapped in an ascending order of the HARQ processes.

9. A terminal device comprising:
a transceiver;
a processor; and
a memory configured to store a computer program executable by the processor,
wherein the transceiver is configured to receive signaling that is used to determine at least one carrier of N carriers, and N is a positive integer; and
the processor is configured to generate a feedback information codebook, wherein the feedback information codebook comprises feedback information corresponding to all hybrid automatic repeat request (HARQ) processes within the at least one carrier of the N carriers,
wherein the signaling comprises carrier indication information, an indication range of the carrier indication information comprises N−1 carriers, and the N−1 carriers refer to all carriers other than a first carrier in the N carriers, wherein the first carrier comprises one of the following:
a carrier used for receiving the signaling;
a carrier corresponding to a control resource set (COREST) used for receiving the signaling, wherein downlink control information (DCI) transmitted in the COREST is configured to schedule a physical channel in the first carrier;
a carrier corresponding to a search space used for receiving the signaling, wherein DCI transmitted in the search space is configured to schedule a physical channel in the first carrier; and
a carrier receiving a first downlink channel, wherein the first downlink channel is a downlink channel that is scheduled for transmission by the signaling,
wherein the feedback information codebook further comprises feedback information corresponding to a HARQ process carried by a physical downlink channel received within a first time period, and
wherein the first time period is determined according to a transmission position of the signaling.

10. The terminal device according to claim 9, wherein the signaling comprises carrier indication information, and the carrier indication information is used to indicate a first carrier set including the at least one carrier among a plurality of carrier sets.

11. The terminal device according to claim 10, wherein at least one carrier included in the first carrier set of the plurality of carrier sets is configured by high-level signaling.

12. The terminal device according to claim 9, wherein the at least one carrier includes the first carrier.

13. A network device, comprising:
a transceiver;
a processor; and
a memory configured to store a computer program executable by the processor,
wherein the transceiver is configured to:
send signaling that is used for a terminal device to determine at least one carrier of N carriers, wherein N is a positive integer; and
receive a feedback information codebook from the terminal device, wherein the feedback information codebook comprises feedback information corresponding to all the hybrid automatic repeat request (HARQ) processes within the at least one carrier of the N carriers,
wherein the signaling comprises carrier indication information, an indication range of the carrier indication information comprises N−1 carriers, and the N−1 carriers refer to all carriers other than a first carrier in the N carriers,
wherein the first carrier comprises one of the following:
a carrier used for sending the signaling;
a carrier corresponding to a control resource set (COREST) used for receiving the signaling, wherein downlink control information (DCI) transmitted in the COREST is configured to schedule a physical channel in the first carrier;
a carrier corresponding to a search space used for receiving the signaling, wherein DCI transmitted in the search space is configured to schedule a physical channel in the first carrier; and
a carrier receiving a first downlink channel, wherein the first downlink channel is a downlink channel that is scheduled for transmission by the signaling,
wherein the feedback information codebook further comprises feedback information corresponding to a HARQ process carried by a physical downlink channel received within a first time period, and
wherein the first time period is determined according to a transmission position of the signaling.

14. The network device according to claim 13, wherein the signaling comprises carrier indication information, and the carrier indication information is used to indicate a first carrier set including the at least one carrier among a plurality of carrier sets.

15. The network device according to claim 14, wherein at least one carrier included in the first carrier set of the plurality of carrier sets is configured by high-level signaling.

16. The network device according to claim 13, wherein the at least one carrier includes the first carrier.

17. The network device according to claim 13, wherein a transmission ending position of the physical downlink channel is within the first time period.

18. The network device according to claim 13, wherein the feedback information in the feedback information codebook corresponding to a HARQ process that is not received within the first time period is negative acknowledgement NACK.

19. The network device according to claim 13, wherein the HARQ process carried by the physical downlink channel that is received in the first time period comprises a first HARQ process, and a number of transmissions of the first HARQ process in the first time period is greater than 1; and
a bit corresponding to the first HARQ process in the feedback information codebook is determined by the feedback information corresponding to the first HARQ process with a latest transmission time within the first time period.

20. The network device according to claim 13, wherein the feedback information corresponding to the at least one carrier is mapped in the feedback information codebook in an ascending order of carrier indexes, and the feedback information corresponding to each carrier is mapped in an ascending order of the HARQ processes.

* * * * *